United States Patent
Laudenklos

(10) Patent No.: US 8,205,659 B2
(45) Date of Patent: Jun. 26, 2012

(54) MOLD-RELEASE LAYER FOR USE IN THE CASTING OF NONFERROUS METALS

(75) Inventor: Manfred Laudenklos, Schoeneck (DE)

(73) Assignee: KS Aluminium-Technologie GmbH, Neckarsulm (DE)

( * ) Notice: Subject to any disclaimer, the term of this patent is extended or adjusted under 35 U.S.C. 154(b) by 412 days.

(21) Appl. No.: 12/089,430

(22) PCT Filed: Sep. 7, 2006

(86) PCT No.: PCT/EP2006/008735
§ 371 (c)(1),
(2), (4) Date: Jun. 4, 2010

(87) PCT Pub. No.: WO2007/028615
PCT Pub. Date: Mar. 15, 2007

(65) Prior Publication Data
US 2010/0237224 A1    Sep. 23, 2010

(30) Foreign Application Priority Data
Sep. 7, 2005 (DE) .......................... 10 2005 042 475

(51) Int. Cl.
*B22C 3/00* (2006.01)
(52) U.S. Cl. .......................... 164/138; 164/418; 164/459
(58) Field of Classification Search .................. 164/138, 164/418, 459
See application file for complete search history.

(56) References Cited

U.S. PATENT DOCUMENTS

| 3,727,666 | A | * | 4/1973 | Vander Sluis | .................... 164/72 |
| 4,454,050 | A | * | 6/1984 | Bertell | .......................... 508/219 |
| 6,051,058 | A | | 4/2000 | Crisci et al. | |
| 6,139,619 | A | * | 10/2000 | Zaretskiy et al. | ............. 106/629 |
| 2006/0159909 | A1 | * | 7/2006 | Aslan et al. | .................... 428/323 |
| 2010/0304129 | A1 | * | 12/2010 | Laudenklos | .................... 428/329 |

FOREIGN PATENT DOCUMENTS

| DE | 198 42 660 A1 | 3/2000 |
| DE | 101 24 434 A1 | 11/2002 |
| EP | 1 258 542 A2 | 11/2002 |
| EP | 1 486 473 A1 | 12/2004 |
| JP | 55-149746 A | 11/1980 |
| WO | WO 97/07909 | 3/1997 |

* cited by examiner

*Primary Examiner* — Kuang Lin
(74) *Attorney, Agent, or Firm* — Muncy, Geissler, Olds & Lowe, PLLC

(57) ABSTRACT

The invention concerns a metal, iron-containing permanent mold, in particular a permanent mold made of steel, which can be subjected to a liquid or flowable aluminum material, and in which a coating for protecting the permanent mold and for achieving an optimal casting result can be produced using a mold release agent. The invention additionally concerns a mold release agent for producing such a coating, and a method for producing such a coating.

11 Claims, No Drawings

MOLD-RELEASE LAYER FOR USE IN THE CASTING OF NONFERROUS METALS

This application is a national stage of International Application No.: PCT/EP2006/008735, which was filed on Sep. 7, 2006, and which claims priority to German Patent Application No.: 10 2005 042 475.9, which was filed in Germany on Sep. 7, 2005, and which are both herein incorporated by reference.

FIELD OF THE INVENTION

The invention concerns a metal, iron-containing permanent mold with a coating that can be subjected to a liquid or flowable aluminum material. The invention additionally concerns a mold release agent for producing such a coating, and a method for producing such a coating on a surface of a permanent mold.

BACKGROUND

Because of the extremely high corrosion that conventional metal materials exhibit with respect to aluminum and other nonferrous metals at typical processing temperatures, areas of contact between the nonferrous metal and the permanent mold must be treated with so-called mold release agents so that trouble-free operation is possible. Especially but not exclusively in the case of pressure casting processes, which are characterized by the use of high temperatures and pressures, a wide variety of requirements, which are listed below, are placed on the mold release agents employed. Thus, the mold release agent must promote metal flow, which results in uniform filling of the permanent mold, while simultaneously serving to improve the demoldability of the cast parts. Furthermore, the mold release agent serves to avoid residues on the permanent mold that can result in inaccuracies in the mold. Excessive gas formation during decomposition of the mold release agent, which would result in porosity of the molded parts, must not occur while the material is being poured into the permanent mold. Lastly, the mold release agent must not contain any hazardous or toxic substances. The quality of the mold release agent is measured by how well it meets these requirements.

Boron nitride (BN), which has a crystal structure similar to that of graphite, is a material that has long been known and used in mold release agents. Like graphite, it has low wettability with respect to many substances, such as silicate melts and also metal melts.

For this reason, there are many studies on non-stick coatings based on boron nitride in order to use it for casting processes. However, the problem with this use is that it does not succeed in permanently applying boron nitride to molds, especially those of a complex nature. A method for permanently applying a temperature-stable, corrosion-resistant mold release layer is described in DE 198 42 660 A1. In this process, a boron nitride powder is applied to the surface of a permanent mold by means of electrostatic coating.

Attempts have also been made to produce binders with inorganic bases incorporating boron nitride. U.S. Pat. No. 6,051,058 describes the production of boron nitride protective coatings with thicknesses from 0.2 to 0.7 mm on refractory materials for the continuous casting of steels. Here, boron nitride on the order of magnitude of 20 to 50% by weight is bound to the refractory material with the aid of high temperature binders in the form of an aqueous coating solution based on metal oxides in the group consisting of $ZrO_2$, zirconium silicates, $Al_2O_3$, $SiO_2$, and aluminum phosphates.

To suppress the wear and corrosion of materials, an anti-abrasion layer is known from DE 101 24 434 A1, in which functional materials are dispersed in a binder matrix. This so-called functional coating consists of an inorganic matrix phase, which consists at least primarily of a phosphate, and a functional material embedded therein, which may be, for example, a metal, graphite, a hard material, a dry lubricant, an aluminum oxide, a silicon carbide, etc. This document also describes a method for producing this functional coating, wherein a functional material in powder form is dissolved in a liquid component, which may be water for example, and to which phosphoric acid is added in order to produce a phosphate. A matrix solution of such a composition, with the liquid component and the phosphate, may also be called a gel because of its consistency. After a material has been coated with this matrix solution, the material undergoes a heat treatment so that an adherent functional coating forms on the base material.

SUMMARY

The object of the present invention is to develop a coating that has long-term stability on a metal, iron-containing permanent mold and that enters into a chemical bond with the base material of the permanent mold, and thus meets or even exceeds the requirements for a mold release agent. It is an additional object of the invention to provide a mold release agent for producing such a coating which is economical to produce and is easy to apply without requiring equipment expenditures. A further object of the invention is to provide a method that is capable of producing such a coating and which permits damage to the coating to be healed easily.

The inventive object with respect to a coating for a permanent mold is attained by the means that a coating is present on at least one surface of the permanent mold, said coating consisting of iron phosphite chemically bound to a base material of the permanent mold, structural parts in the form of $Al_2O_3$ and/or $SiO_2$ and/or $TiO_2$ and/or $ZrO_2$ having a grain size of 80 nm to 200 nm, primary parts in the form of $Al_2O_3$, $SiO_2$, $TiO_2$, ZnO, $ZrO_2$, $CeO_2$ having a grain size of 2 nm to 80 nm and at least traces of an organic and/or inorganic gelatin as dispersing agent, and a polymer, consisting of polymerized monoaluminum phosphate and/or monozinc phosphate and/or monomagnesium phosphate and/or sodium phosphate and/or boron phosphate, that at least partially surrounds the iron phosphite, the structural parts, and the primary parts.

In preferred embodiments of the invention, the coating additionally contains: lubricant parts in the form of boron nitride having a grain size of 2 μm to 15 μm and/or mica, as silicate mineral.

DETAILED DESCRIPTION

The requirements for a mold release agent in the form of a coating with long-term stability are fulfilled especially well by the inventive coating on the metallic permanent mold. By this means, metal flow is promoted in that the oxide film of the aluminum material is broken up by the structural parts protruding from the coating, and the liquid aluminum material beneath the oxide layer can disperse very easily into the permanent mold. The coating thus offers optimal conditions for filling of the permanent mold. The lubricant parts in the form of boron nitride (BN) serve as a slip plane for the liquid or flowable aluminum and thus support the metal flow, while at the same time also improving the demoldability of the cast parts.

A coating is formed that adheres strongly to the surface of the permanent mold, wherein the strong bond is produced by the chemical binding of the phosphate with the iron of the base material of the permanent mold, with phosphate preferably being used. This type of strong binding of the coating to the base material of the permanent mold prevents residues from remaining adhered to the permanent mold, which could result in dimensional inaccuracies. A further advantage of the inventive coating is that the coating is stimulated into increased polymerization at relatively high temperatures. This results in longer polymers, which not only increases adhesion and cohesion, but also increases the elasticity of the coating. As a result, the coating, which has long-term stability and good adhesion, is extremely elastic at relatively high temperatures such as those arising during filling of the permanent mold, and can follow the permanent mold's changes of shape elastically and thus, advantageously, without damage to the coating.

With regard to the mold release agent, the object of the invention is attained in that the mold release agent is made from deionized water and contains the following ingredients: a component in the form of sodium hydroxide and/or calcium hydroxide and/or aluminum chloride, a phosphate-containing binder in the form of monoaluminum phosphate and/or monozinc phosphate and/or monomagnesium phosphate and/or monosodium phosphate and/or boron phosphate, and a component of structural parts in the form of $Al_2O_3$ and/or $SiO_2$ and/or $TiO_2$ having a grain size of 80 nm to 200 nm, a component of primary parts in the form of $Al_2O_3$, $SiO_2$, $TiO_2$, ZnO, $ZrO_2$, CeO having a grain size of 1 nm to 10 nm, and an organic or inorganic dispersing agent, preferably gelatin.

In a preferred embodiment of the invention, the mold release agent also contains: a component of lubricant parts in the form of BN and/or magnesium aluminum silicate and/or molybdenum disulfide, having a grain size of 2 μm to 15 μm, and/or mica.

The inventive mold release agent offers the advantages that it is both economical to produce, being based on deionized water, and simple to apply to the tool on account of its viscosity. In the simplest case the mold release agent can be sprayed onto the permanent mold. Furthermore, the mold release agent meets the requirements for a mold release agent in that it does not contain toxic substances, which can only be disposed of at high cost.

The object of the invention is attained with regard to the method for producing a coating in that, first, the mold release agent is applied to a mold surface, and then the permanent mold is heated to a temperature of at least 200° C. As a result of this heating, the phosphate undergoes chemical binding to the iron of the base material, and the monoaluminum phosphate and/or monozinc phosphate and/or monomagnesium phosphate and/or monomanganese phosphate and/or boron phosphate form polymers that form a coating that adheres strongly to the surface of the permanent mold. It is advantageous here that the mold release agent, which consists of deionized water, is already fully evaporated from the coating at this temperature, so that there is very little or no gas formation during filling of the permanent mold. Moreover, the polymerization is further supported by the raising of the temperature, so that an additional advantageous effect of the coating is produced as described above. The use of gelatin is especially advantageous here, as nanoparticles are automatically produced in this way.

The use of an organic dispersing agent must likewise be considered important. In particular, a gelatin marketed under the trade name "Gelita" is used. The primary ingredients of this gelatin are calcium, with a content of 3950 mg per kg, and magnesium, with a content of 1500 mg per kg, with the remainder consisting of organic and inorganic ingredients. The task of the gelatin is preferably to make a balanced contribution to potential compensation in dispersion and to accelerate the reaction. To explain the potential compensation by the gelatin in the binder phase, reference is made herewith to the Richardson-Ellingham diagram, which is known and from which the potential differences of the particular chemical compound used can be read. Magnesium and calcium, as primary ingredients of the gelatin, serve here to stabilize the structural parts and primary parts in the solubilizing of the hot base material by the coating, so that it is possible to control the binding of the coating to the base material. The gelatin is present in the mold release agent at 0.5% to 5% by weight, and is thus detectable at least at trace levels in the coating of the functional component.

Moreover, in the event of damage to the coating, the coating is very easily healable, since flaws in the coating are immediately healed upon renewed application of the mold release agent to the permanent mold. New iron phosphite is formed in this process, and the phosphate polymerizes due to the temperature of the permanent mold, so that the coating heals completely.

On the surface, which of course is preferably the side of the permanent mold corresponding to the cast part to be produced, there is formed a coating having a thickness of approximately 1 to 80 μm; thicknesses between 30 and 50 μm are preferred, depending on the particular application. The coating thickness depends on the application, in other words on the casting method, with the thinnest coatings being used for pressure casting and the thickest coatings being used at low pressure. The thinnest coatings are used for pressure casting, since good heat transfer to the permanent mold is deliberately established here in order to permit rapid solidification of the cast part. In the combined process known as squeeze casting, a medium thickness is established, since here the casting mold is filled slowly and then subjected to high pressure. Thus, a reduced heat transfer to the permanent mold is useful in this process. In contrast, thick coatings are advantageous in low-pressure casting, since the mold is filled relatively slowly here and a slow cooling of the cast part is advantageous. Moreover, the inventive permanent mold provided with a coating is, of course, also usable for gravity casting.

The coating present on the surface of the permanent mold is chemically bonded to the base material by means of the iron phosphite. The iron phosphite thus performs the function of an adhesive between the coating and base material. The structural parts in the form of $Al_2O_3$ and/or $SiO_2$ and/or $TiO_2$ and/or $ZrO_2$ have an approximate size from 80 nm to 200 nm; they interlock with one another and form a coating on the base material. The term "structural parts" is chosen intentionally here, since particles that have a structured surface, rather than being smooth, are used by preference. The primary parts in the form of $Al_2O_3$ and/or $SiO_2$ and/or zinc oxide and/or titanium dioxide and/or zirconium dioxide and/or cerium oxide, which are present in a size from 1 nm to 10 nm, preferably embed themselves very lightly in the gaps between the structural parts. The much larger lubricant parts of boron nitride lie between the structural parts in the coating and are held by the bond between the structural parts and polymers. Simply on account of its fractal structure, the coating thus constructed has an interlocking effect; however, the primary bond between the iron phosphite and the structural parts, the primary parts, and the lubricant parts is produced by the phosphate formed by the polymerized monoaluminum phosphate and/or monozinc phosphate and/or monomagnesium phosphate and/or sodium phosphate and/or boron phosphate. The chains of the polymers produce the cohesion between the chemically bound iron phosphite, the structural parts, the primary parts, and the lubricant parts. The more the permanent mold, and thus the coating, is heated, the longer the polymer chains become, so that the elasticity of the coating increases with increasing temperature. The inventively employed polymers polymerize at approximately 200° C. and have a vitrification temperature of approximately 830° C. The liquid aluminum has a temperature of approximately 730° C. and thus does not reach the vitrification temperature of the polymers. In this way, an extremely stable system that is very well suited for the casting of aluminum materials is created as a coating structure.

The iron phosphites serve as an adhesive to the base material of the permanent mold, and the primary parts are advantageously used to close the gaps between the structural parts so as to produce a very smooth surface. Adhesion of the liquid casting material is thus nearly impossible. The structural parts are present in a size range from 80 nm to 200 nm and project from the surface as edges. The structural parts, which are strongly structured at their surfaces, advantageously tear fissures in the oxide layer of the liquid aluminum and pulverize the oxide film, so that the oxide film is pulverized into extremely small pieces and thus is not present as lattice defects in the grain structure of the cast part. An advantage of the inventively used structural parts is thus that the oxide layer is destroyed and comminuted.

The lubricant parts that are present in the form of boron nitride have a very much larger size than the primary and structural parts. According to the invention, the structural parts, with a proportion of up to 10% by weight in the liquid mold release agent, form the largest part of the coating. The primary parts serve as a filler for the intermediate spaces and thus serve to smooth the layer. The lubricant parts, present at up to 5% by weight, are embedded in the structural parts with a fine distribution, and likewise project from the surface of the coating. As a result of the number of lubricant parts, they do not form the largest surface of the coating, but instead are present in finely divided form, so that they serve as a lubricant, firstly during pouring, but primarily for demolding from the permanent mold and removal of the cast part. Demolding is facilitated in an advantageous manner through the use of the inventive coating, because a very smooth surface is present as a result of the structural parts and the primary parts with their smoothing action, while at the same time a lubricant is made available by the lubricant parts.

Experiments have demonstrated optimal formation of the coating is provided by the addition of an acid buffer in the form of sodium hydroxide and/or calcium hydroxide and/or aluminum chloride and the establishment of a pH value of 4 to 5. The acid buffer thus serves to delay the reaction and provide for a uniform progress of the reaction.

According to the invention, the mold release agent is applied to the cold permanent mold in that the mold release agent is sprayed on and the permanent mold is heated. Starting at a temperature of approximately 200° C., the monoaluminum phosphate and/or monozinc phosphate and/or monomagnesium phosphate and/or sodium phosphate and/or boron phosphate polymerize, resulting in the creation of a coating with long-term stability on the surface of the permanent mold. A customary temperature for preheating during pressure casting is a temperature between 220° C. and 280° C., so that an optimal temperature for polymerization of the mold release agent is present here. In low-pressure casting and squeeze casting the preheating temperatures are above 300° C., so that an optimal temperature for polymerization of the mold release agent is present here as well. The liquid metal, with a temperature of approximately 720° C. to 730° C. during casting of aluminum, lies below the glass transition temperature. But even thixocasting is above 200° C., and thus the use of the inventive layer is also possible with this method.

The invention claimed is:

1. Mold release agent for producing a coating on a permanent mold, wherein the mold release agent is made from deionized water and comprises the following ingredients:
   a component in the form of sodium hydroxide and/or calcium hydroxide and/or aluminum chloride,
   a phosphate-containing binder in the form of monoaluminum phosphate and/or monozinc phosphate and/or monomagnesium phosphate and/or monosodium phosphate and/or boron phosphate, and
   a component of structural parts in the form of $Al_2O_3$ and/or $SiO_2$ and/or $TiO_2$ and/or $ZrO_2$ is present and has a grain size of 80 nm to 200 nm, and/or
   primary parts in the form of $Al_2O_3$, $SiO_2$, ZnO, $ZrO_2$, CeO, $TiO_2$ and/or mica are present and have a grain size of 2 nm to 80 nm,
   an organic and/or inorganic dispersing agent.

2. Mold release agent according to claim 1, wherein a component of lubricant parts in the form of boron nitride and/or magnesium aluminum silicate and/or molybdenum disulfide are present in the mold release agent and have a grain size from 2 μm to 15 μm.

3. Mold release agent according to claim 1, wherein a pH level of 4 to 5 is set in the mold release agent.

4. Mold release agent according to claim 1, wherein the proportion of binder in the mold release agent is less than or equal to 5% by weight.

5. Mold release agent according to claim 1, wherein the proportion of structural parts in the mold release agent is less than or equal to 10% by weight.

6. Mold release agent according to claim 1, wherein the proportion of primary parts in the mold release agent is less than or equal to 3% by weight.

7. Mold release agent according to claim 1, wherein the mold release agent contains lubricant parts, and wherein the proportion of lubricant parts in the mold release agent is less than or equal to 5% by weight.

8. Mold release agent according to claim 1, wherein the release agent comprises gelatin, the proportion of gelatin in the mold release agent is between 0.5% by weight and 5% by weight.

9. Mold release agent according to claim 1, wherein the organic and/or inorganic dispersing agent comprises gelatin.

10. Mold release agent according to claim 1, wherein the proportion of primary parts in the mold release agent is between 1% by weight and 3% by weight.

11. Mold release agent according to claim 9, wherein at least calcium and magnesium are contained in the gelatin.

* * * * *